F. J. PEARSON.
FRUIT SIZING APPARATUS.
APPLICATION FILED JUNE 13, 1921.

1,399,317.

Patented Dec. 6, 1921.
4 SHEETS—SHEET 2.

WITNESSES

INVENTOR
F. J. Pearson,
BY
ATTORNEYS

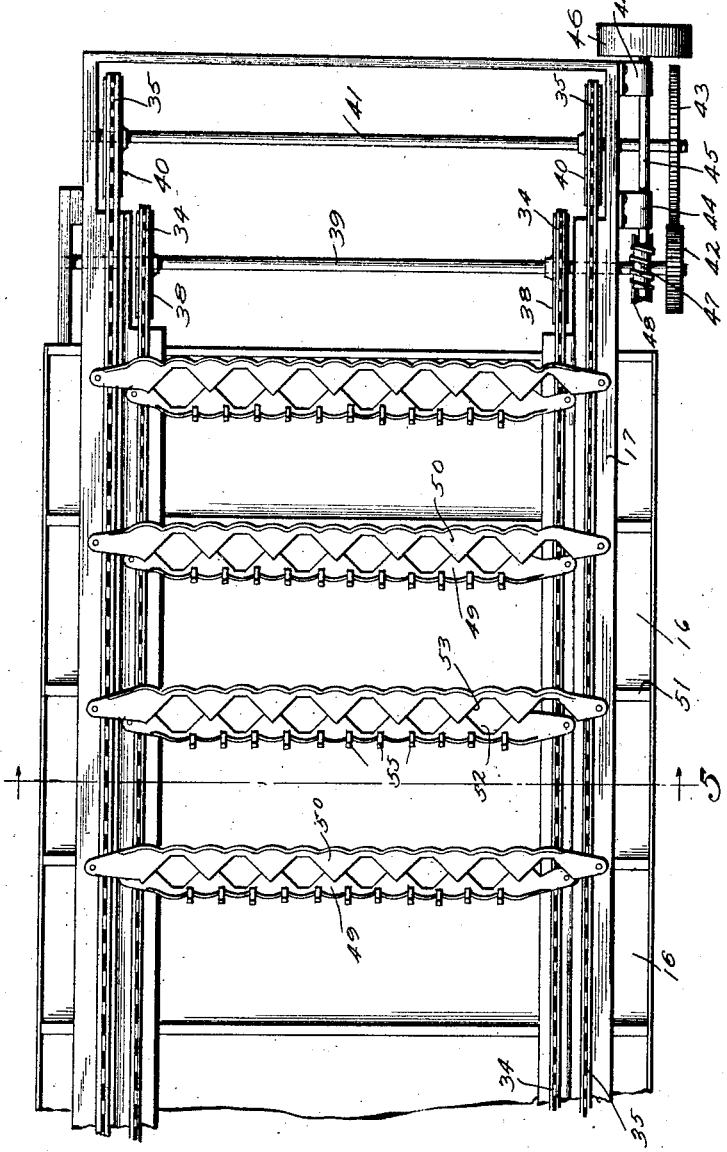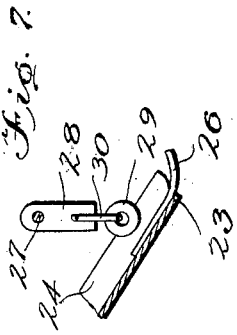

F. J. PEARSON.
FRUIT SIZING APPARATUS.
APPLICATION FILED JUNE 13, 1921.
1,399,317.
Patented Dec. 6, 1921.
4 SHEETS—SHEET 4.
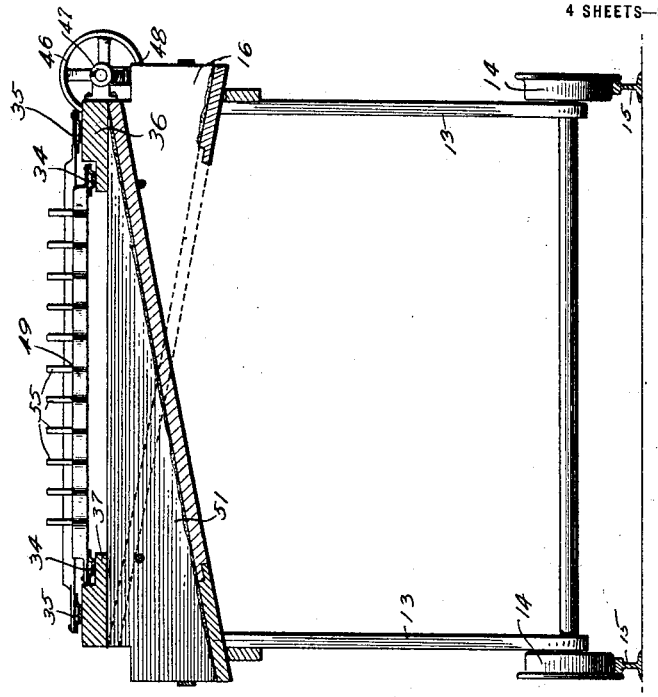
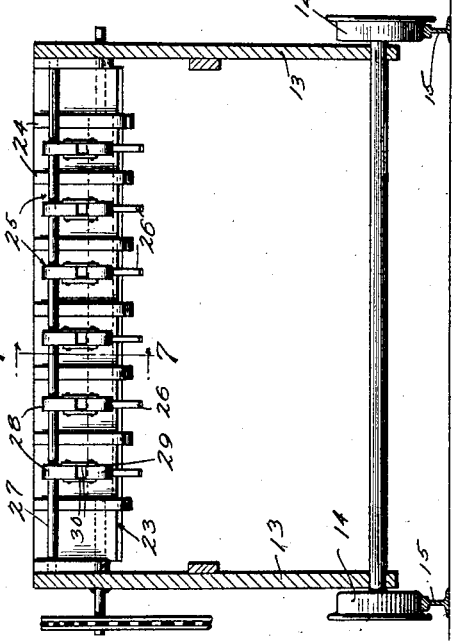
WITNESSES
INVENTOR
F. J. Pearson,
BY
ATTORNEYS

UNITED STATES PATENT OFFICE.

FLORENT JODON PEARSON, OF TROY, OHIO.

FRUIT-SIZING APPARATUS.

1,399,317.　　　　　Specification of Letters Patent.　　Patented Dec. 6, 1921.

Application filed June 13, 1921. Serial No. 477,121.

*To all whom it may concern:*

Be it known that I, FLORENT J. PEARSON, a citizen of the United States, and a resident of Troy, in the county of Miami and State of Ohio, have invented certain new and useful Improvements in Fruit-Sizing Apparatus, of which the following is a specification.

My present invention relates generally to fruit graders and more particularly to a fruit sizing machine of the general characteristics of the Patent 1,242,034 granted October 2, 1917, and of which I am now the owner.

My invention more specifically relates to a sizing apparatus whose action is based upon the differential movement of fruit holding members which in their movement gradually become spaced farther and farther apart permitting the fruit to drop through when in the movement of the members their spacing permits, the fruit so dropping at intervals in the movement of the members and conveyed to separate bins containing fruit of different sizes.

The primary object of my present apparatus is the provision of a construction which in certain respects provides for more effective sizing action and avoids the danger of inaccurate grading, as well as one which in certain other respects provides for effective coöperation of the parts in the automatic feeding of fruit and the like to the sizing members so that the feed is uniform and without danger of injury to the articles being fed.

In the above as well as certain other specific respects, the construction of my present invention generally refines and improves the structure described and claimed in the patent as above as well as existing apparatus of a like nature.

My invention is shown in the accompanying drawings, in which,

Fig. 3 is a similar view of the forward end,

Fig. 4 is a vertical cross section taken substantially on line 4—4 of Fig. 2,

Fig. 5 is a similar view taken substantially on line 5—5 of Fig. 3,

Fig. 6 is a detail perspective view of a portion of one of the sizing bars, and

Fig. 7 is a vertical section taken through the feed device substantially on line 7—7 of Fig. 4.

Figure 1:
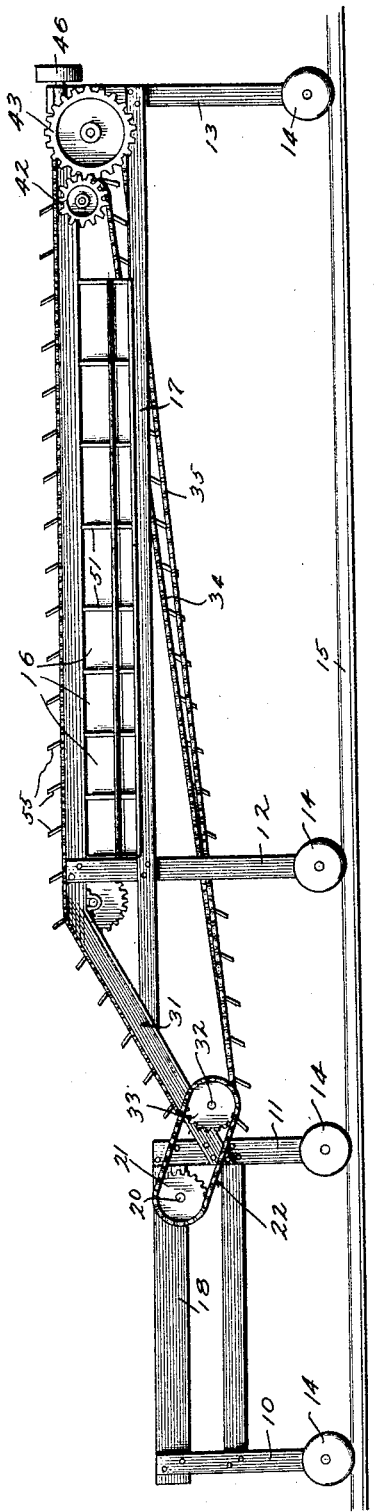
Figure 1 is a side elevation of the complete machine.

Referring now to these figures the frame of my present improved apparatus preferably includes uprights 10, 11, 12 and 13, proceeding from the front to the rear, all connected, and each provided at its lower end with a wheel 14, the several wheels traveling on rails or tracks 15 so that the apparatus as a whole may be shifted in the direction of its length to permit of selected registration of the inclined fruit slides 16 in the lower portion of the sizing frame 17 with fruit receiving bins and the like (not shown), which in practice are located upon opposite sides of the tracks or rails 15.

Figure 2:
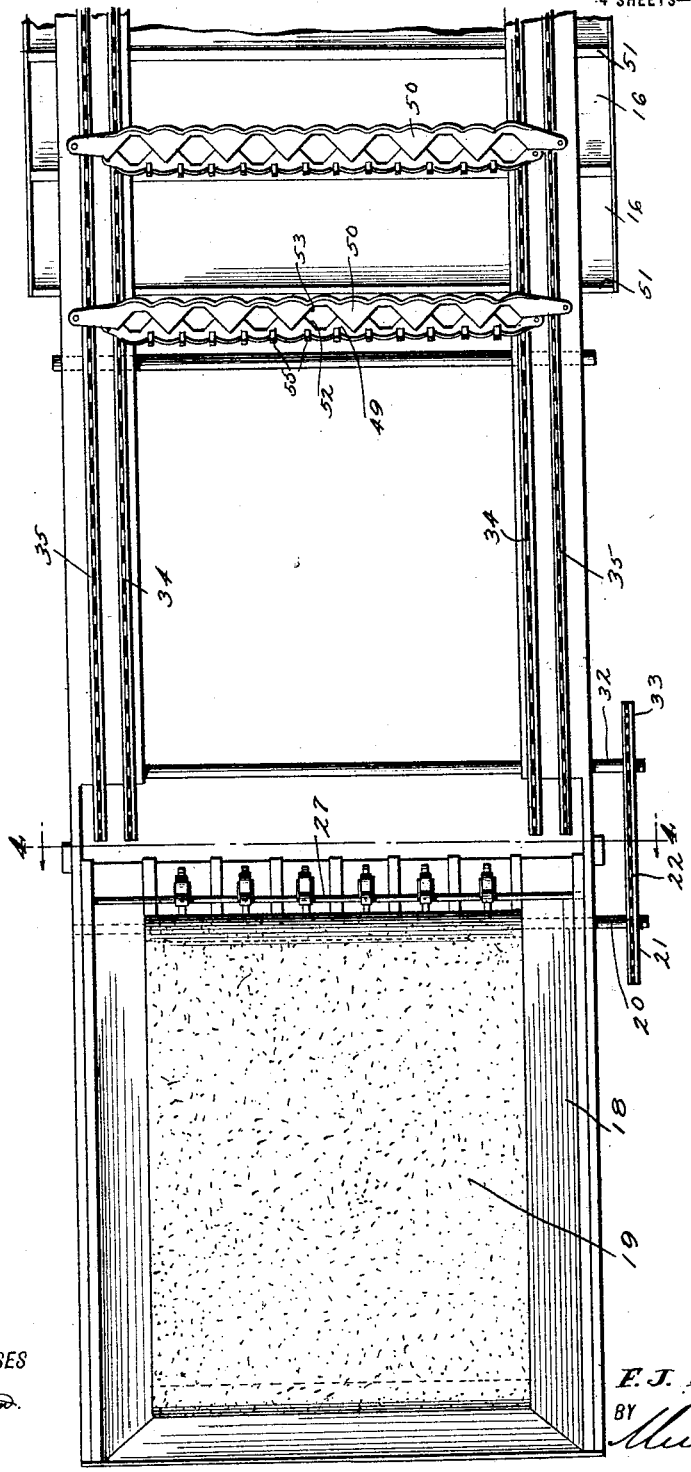
Fig. 2 is a top plan view of the rear or feed end of the apparatus.

The uprights 10 and 11 form parts of a feed table 18 which as most clearly seen in Fig. 2 is of rectangular form and has a flexible feed apron 19, one shaft 20 of which has a sprocket wheel 21, shown in Fig. 1 and driven by a sprocket chain 22. This feed apron 19 discharges fruit at its rear end upon a downwardly and rearwardly inclined feed slide 23 shown in Fig. 4, separated by partition strips 24 into a plurality of separate channels down which lines of fruit may move. These channels are indicated at 25 in Fig. 4 and it will be noted that at the lower end of each of the channels 25, the feed slide 23 has a depending curved fruit holding arm 26 upon which the lowermost article lightly rests between the lower ends of the adjacent partition strips 24.

Across and spaced from the feed slide 23 above its center is a bar 27 having opposite the several channels 25 of the slide blocks 28 to which rollers 29 are loosely connected by means of connecting strips 30, these rollers being adapted to lightly engage the articles in the slide channels 25 so as to avoid too great pressure upon those articles resting at the lower ends of the channels upon the feed arms 26. This structure is clearly seen in Figs. 4 and 7 and its function will be more readily apparent from the following description.

In the structure of the sizing frame 17, the uprights 12 and 13 form parts, this sizing frame being connected at its forward end by downwardly inclined beams 31, to the feed table and having adjacent to the lower ends of the said inclined beams 31 a cross shaft 32 around the sprocket wheel 33 of which one end of the sprocket chain 22 driving the feed apron 19 is extended.

Shaft 32 also has sprockets for the inner and outer endless sizing chains 34 and 35 at each side of the sizing frame 17, the upper rails 36 of which have inner rabbets 37 upon which the inner chains 34 travel in planes slightly below the planes of the outer chains 35.

At the rear end of the sizing frame the inner chains 34 travel around the sprockets 38 of a cross shaft 39 while the outer chains 35 extend rearwardly beyond the inner chains and around the sprockets 40 of a cross shaft 41 parallel with and rearwardly beyond shaft 39. These shafts 39 and 41 are extended at one end beyond one side of the sizing frame 17 and are provided with intermeshing gears 42 and 43 respectively of small and large size so that by virtue of the difference in the lengths of the inner chains 34 and the outer chains 35 and the particular manner in which they are mounted, their differential movement is provided for.

Adjacent to the extended ends of the rear cross shafts 39 and 41, one side of the sizing frame 17 has bearings 44 for a driven shaft 45, the rear end of which has a pulley and the like 46 receiving power from any suitable source, and the opposite end of which has a worm 47 engaging the worm wheel 48 of shaft 39.

Secured at spaced intervals to, and extending between the inner chains 34 are a series of cross bars 49 and similarly secured at spaced intervals to the outer chains 35 are a series of cross bars 50. These bars 49 and 50 coöperate in pairs along the upper run of the fruit sizing conveyer constituted by the chains 34 and 35 and their bars 49 and 50, and thus coöperate along the upper portion of the sizing frame 17 above the lengthwise series of transverse fruit slides 16, which latter are separated by partitions 51 as seen in Figs. 1 and 5 and may be either inclined in the same direction or at one side only of the frame, or alternately reversed as shown in Fig. 5, throwing the fruit to both sides of the frame.

By virtue of the fact that the inner chains 34 occupy a plane below the plane of the outer bars 50 it is quite obvious that the coöperating bars of the several pairs may overlap, and this overlapping condition does as a matter of fact exist as plainly seen by a comparison of Figs. 2 and 3, the inner adjacent edges of the bars being recessed, their recesses 52 and 53 being generally of triangular form so that their recessed overlapping edges coöperate to constitute a series of fruit receiving apertures of approximately square outline lengthwise of each pair of bars and transversely of the sizing conveyer.

The outer edges of the bars of each pair are moreover flanged, the flanges 54 thereof upstanding as shown in Fig. 6 in particular so that danger of the fruit rolling off the bars, is avoided. This danger is however slight on account of the fact that the fruit when received on the bars immediately becomes seated in the coöperating recesses thereof wherein the fruit is supported by contact with four points of the bars around the fruit and continues to rest until, in the movement of the conveyer the enlargement of the recesses permits the fruit to drop through and into one of the discharge slides 16.

Each of the bars 49 is moreover provided along its outer edge with a series of upstanding inclined fingers 55, disposed in pairs of which the fingers of each pair are upon relatively opposite sides of the center of one of the recesses 52 and are sufficiently spaced to pass beneath the feed slides 23 between adjacent partitions 24 and upon relatively opposite sides of the corresponding fruit holding arm 26.

It is quite obvious that in the differential movement of the inner and outer chains 34 and 35, the arms 50 of the outer chains must each pass one of the arms 49 of the chains 34 and in my improved structure this passage must be accomplished at a time when the chains are spaced apart sufficient to allow for the upstanding fingers 55 of the bars 49. This movement takes place as the chains pass along the rear portion of the lower run of the conveyer where they are divergently related as seen in Fig. 1.

It thus becomes obvious that as each pair of bars 49 and 50 passes upwardly around the forward end of the sizing conveyer, that is around the forward end of the sizing frame 17, the pairs of upstanding fingers 55 will elevate the lowermost fruit within the feed channels 25, off of the feed arms 26, and the fruit so dislodged will readily fall into the coöperating recesses of the bars 49 and 50 forming the sizing apertures. As the bars continue along the upper run of the conveyer above the several discharge slides 16, the relatively faster movement of the bars 50 causes a gradual enlargement of the sizing apertures so that the fruit can drop as soon as the increase in the size of the apertures permits. The fruit will thus drop at various points in the length of the conveyer, and into the proper compartments of the discharge slide 16 from which fruit may pass into bins either upon one or both sides of the apparatus.

The movement of the entire apparatus by virtue of its wheels 14 on the tracks or rails 15, permits of shifting thereof opposite empty bins when those into which it has previously discharged sized fruit have become filled.

It will be appreciated that the particular sizing means proposed by my invention will effectively coöperate with the feed device in such a way that the automatic feed of the fruit to the sizing conveyer may be accomplished with minimum danger of injury to the fruit and maximum efficiency in so far as a continuous uniform feed is concerned.

I claim:

1. In a fruit sizing apparatus, the combination of differentially moving bars, endless flexible members to which said bars are connected, each of said bars having an upstanding flange along one edge and having recesses along its other edge, the recessed edges of the bars coöperating to form series of fruit sizing apertures lengthwise of the bars.

2. In a fruit sizing apparatus, endless differentially movable members, sizing bars connected thereto and coöperating in pairs, one bar of each of said pairs moving in the same direction having a lengthwise series of upstanding pins, and feeding means having a series of feed channels, an article holding arm at the lower central portion of each channel, and partitions between said channels, the lower ends of which partitions extend downwardly at opposite sides of the said article holding arms to receive the fingers of said bars therebetween.

3. In a fruit sizing apparatus, the combination of differentially moving fruit sizing bars having means coöperating to form fruit sizing apertures which gradually enlarge during movement of the bars in the same direction, one of said bars having upwardly projecting fingers in a series therealong, and a feeding device including fruit holding means in a series through which the fingers of said bar are movable as described.

4. In a fruit sizing apparatus, a feed device including an inclined feed board having a plurality of feed channels, a fruit holding arm depending centrally from each of said channels, partitions between the said channels having their lower ends extending below the feed board upon opposite sides of and spaced from the said fruit holding arms, and fruit engaging means extending into the channels above the said arms to partially sustain the weight of fruit in the channels.

5. In a fruit sizing apparatus, a feed device including an inclined feed board having a plurality of feed channels, a fruit holding arm depending centrally from each of said channels, partitions between the said channels having their lower ends extending below the feed board upon opposite sides of and spaced from the said fruit holding arms, and fruit engaging means extending into the channels above the said arms to partially sustain the weight of fruit in the channels, said last named means including fruit engaging rollers, and movable means supporting and yieldingly holding said fruit engaging rollers.

FLORENT JODON PEARSON.